Patented Nov. 7, 1933

1,934,076

UNITED STATES PATENT OFFICE 1,934,076

CARBON REMOVER

Eugene Lieber, Cranford, N. J., assignor to Standard Oil Development Company, a corporation of Delaware No Drawing. Application May 7, 1932
Serial No. 609,979

10 Claims. (Cl. 87—5)

This invention relates to improvements in liquid compositions for removing or loosening carbon deposits, and to methods of using such compositions.

The improved carbon remover comprises a class of chemical compounds known broadly as aliphatic diamines used in conjunction with pyridine or its related or substituted compounds. This invention is based on the discovery that although neither of these classes of materials used alone is satisfactory as a carbon remover, yet the combination acts upon the carbon deposit in a specific manner, resulting in an unexpectedly quick and substantially complete removal of the carbon.

One example of the invention is a composition comprising ethylene diamine and pyridine. These materials may, for instance, be prepared for use by mixing the liquid pyridine with a 65% solution of ethylene diamine in water, and may be used by applying the solution to the carbon coated surfaces in whatever manner is most suitable for the particular material being treated. For example, for removing the carbon from spark plugs, for which the preferred solution is very advantageous, the spark plugs are immersed directly in the solution for a short time (usually five minutes is sufficient) and then the carbon which has become loosened and flaky may be easily removed from the spark plugs by a light rubbing with a cloth or by blowing off with a blast of air or in any other suitable manner.

It is not necessary that the ethylene diamine be used in solution in water but it may be used as such in combination with the pyridine or one or both of these materials may be diluted with any inert solvent.

The following tests show the advantageous results obtained by the use of ethylene diamine in water solution and pyridine in removing carbon from spark plugs. Various volume percentages of the two ingredients, ethylene diamine and pyridine, were used and the results recorded as the estimated percent removal of the carbon after five minutes.

Table I—Ethylene diamine and pyridine

| Percent ethylene diamine | Percent pyridine | Estimated percent removal of carbon after 5 minutes |
|---|---|---|
| 100 | 0 | 5 |
| 90 | 10 | 10 |
| 75 | 25 | 50 |
| 50 | 50 | 80 |
| 10 | 90 | 10 |
| 0 | 100 | 5 |

The table indicates an unexpectedly great efficiency in a mixture of 50 percent pyridine and 50 percent ethylene diamine; this mixture gave results superior to those obtained with other percentage mixtures of the same ingredients and also was superior to the results obtained with either of the ingredients alone. A still further improvement is obtained by saturating the solution of pyridine and ethylene diamine with anhydrous ammonia.

The carbon remover prepared according to this invention works very satisfactorily while cold, and this is a distinct advantage, but it may also be used hot or under pressure if desired.

Other amines can be used in place of the ethylene diamine in conjunction with pyridine. For example, propylene diamine is as effective as ethylene diamine. The alkyl diamines, as a class, are suitable for use according to the invention. Instead of using pyridine in the mixture, its related or substituted compounds may be used, including compounds having six-membered rings with nitrogen in the ring; for example, quinoline, isoquinoline, phenanthridine, naphthyridine, acridine and anthropyridine. Also the condensed quinolines which are similar in chemical behavior to the quinolines may be used, such as naphthoquinolines, anthroquinolines, quinoquinolines, phenanthrolines, etc. For example, a composition comprising quinoline and ethylene diamine gave results showing this solution to be as satisfactory as the solution of pyridine and ethylene diamine.

If the article having the carbon coated surface is too large to be immersed directly in the carbon remover solution, the solution may be applied to the carbon-coated surface in any suitable manner so that the solution will stay in contact with the carbon-coated surface for the desired length of time. In internal combustion engines, the carbon remover may be injected either into the intake manifold or into the cylinder directly, allowed to stand until the carbon has been loosened and then the remaining solution may be drawn off. Subsequently the carbon is either burned during operation of the motor, or washed down into the crankcase by oil seepage or blown out through the exhaust. The solution may be re-used so long as effective.

The specific embodiments of the invention described are subject to various changes and it is intended to claim all novelty inherent in the invention as far as the prior art permits.

I claim:

1. A carbon remover comprising an aliphatic diamine and a compound of the pyridine type.

2. A carbon remover comprising a solution of an aliphatic diamine and a compound of the pyridine type.

3. A carbon remover comprising a solution of an aliphatic diamine and a compound of the pyridine type, said solution containing dissolved anhydrous ammonia.

4. A carbon remover comprising in solution, ethylene diamine and pyridine.

5. A carbon remover comprising in solution, ethylene diamine and pyridine, said solution containing dissolved anhydrous ammonia.

6. A carbon remover comprising a compound of the pyridine type dissolved in a water solution of ethylene diamine.

7. A carbon remover consisting of approximately equal parts by volume of pyridine and ethylene diamine in solution.

8. Method of cleaning articles coated with adherent carbon deposits, comprising contacting the articles with a solution of a compound of the pyridine type and an aliphatic diamine and removing the loosened carbon.

9. Method of loosening carbon deposits in an internal combustion engine, which comprises injecting into the interior thereof in any desired manner a composition comprising an aliphatic diamine and a compound of the pyridine type.

10. Method of loosening adherent carbon deposits from surfaces coated therewith, which comprises applying to said surfaces a composition comprising an aliphatic diamine and a compound of the pyridine type in such a manner that the composition will remain in contact with the surfaces to be cleaned just a sufficient length of time to loosen the acidic gummy binder which causes the carbon deposit to adhere firmly to the surface, but will not allow said composition to remain in contact with said surfaces any longer than necessary.

EUGENE LIEBER.